(12) United States Patent
Dement

(10) Patent No.: US 7,268,993 B2
(45) Date of Patent: Sep. 11, 2007

(54) INTEGRATED PROTECTOR AND SPLITTER

(75) Inventor: Mark Lamar Dement, Round Rock, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 240 days.

(21) Appl. No.: 10/853,564

(22) Filed: May 25, 2004

(65) Prior Publication Data

US 2005/0264969 A1   Dec. 1, 2005

(51) Int. Cl.
*H02H 3/22*   (2006.01)
(52) U.S. Cl. ...................................... 361/119
(58) Field of Classification Search ............... 361/119, 361/93.1; 370/412
See application file for complete search history.

(56) References Cited

U.S. PATENT DOCUMENTS

| | | | | |
|---|---|---|---|---|
| 5,687,213 | A | * | 11/1997 | Larkin ......................... 379/21 |
| 5,694,680 | A | * | 12/1997 | Yamada et al. ............... 29/850 |
| 6,078,080 | A | * | 6/2000 | Kadosh et al. .............. 257/344 |
| 6,084,761 | A | * | 7/2000 | Casey et al. ................ 361/119 |
| 6,327,129 | B1 | | 12/2001 | Oertel et al. |
| 6,418,195 | B1 | * | 7/2002 | Autry et al. .................. 379/21 |
| 6,418,221 | B1 | | 7/2002 | Snow et al. |
| 6,438,226 | B1 | * | 8/2002 | Guenther et al. ...... 379/413.04 |
| 6,556,661 | B1 | | 4/2003 | Ingalsbe et al. |
| 6,608,899 | B1 | * | 8/2003 | Spooner et al. ............. 379/412 |
| 6,639,779 | B2 | | 10/2003 | Knigge et al. |

(Continued)

FOREIGN PATENT DOCUMENTS

JP  2002/252718  2/2001

(Continued)

OTHER PUBLICATIONS

"ADSL Splitter, ADSL Filter, ADSL Accessories Manufacurer-Telewell," http://telewell.com/tw/showroom/Accessories/adsl/adsl.htm, Feb. 16, 2004.

(Continued)

*Primary Examiner*—Stephen W. Jackson
*Assistant Examiner*—Scott Bauer
(74) *Attorney, Agent, or Firm*—Toler Schaffer LLP

(57) ABSTRACT

A method and five pin integrated protector and splitter module are provided for use at a protector panel of a facility for housing telephone-related equipment, where the module is capable of being used in conjunction with at least a broadband MODEM separate from a digital loop carrier. The module includes a first pair of module pins for receiving a signal including voice and data, and a protection circuit coupled with the first pair of module pins. The protection circuit includes a ground contact for coupling with a ground potential at the protector panel, for protecting telephone-related equipment from at least one of an overvoltage and overcurrent condition present at the first pair of module pins. The module further includes a splitter circuit coupled with the protection circuit, for splitting the voice from the received signal as a voice signal, and a second pair of module pins coupled with the splitter circuit, for providing the voice signal from the five pin module to the digital loop carrier. The splitter circuit of the five pin integrated protector and splitter module may further include a data terminal set for providing at least the data of the received signal to the broadband MODEM.

19 Claims, 4 Drawing Sheets

U.S. PATENT DOCUMENTS

| | | | |
|---|---|---|---|
| 6,738,474 B1 * | 5/2004 | Miller | 379/413.03 |
| 6,895,089 B2 * | 5/2005 | Wang | 379/387.01 |
| 2002/0089804 A1 | 7/2002 | Chea, Jr. | |
| 2002/0106075 A1 * | 8/2002 | Foss et al. | 379/399.01 |
| 2003/0123208 A1 | 7/2003 | Napiorkowski | |
| 2003/0194059 A1 | 10/2003 | Ingalsbe et al. | |

FOREIGN PATENT DOCUMENTS

| | | |
|---|---|---|
| JP | 2003/070031 | 3/2003 |

OTHER PUBLICATIONS

Maytum, Michael J. "F-Telecom Circuit Protection Trends (PDF)," Passive Component Industry, http://www.ec-central.org/magazine/PDF/art_2_jan_feb_01.pdf, Jan./Feb. 2001, pp. 11-38, Power Innovations Ltd., UK.

Krone, Inc., "XDSL Service Delivery, Difficult or Easy (PDF)," http://www.kroneamericas.com/pdf/white_paper_pdf/ADSL%20Service%20Delivery.pdf, Jan. 21, 2003, Krone, US, pp. 1-8.

Solid State Supplies, "Module Multiply Protects Telecomms Lines," http://www.electronicstalk.com/news/sol/sol106.html, Jun. 18, 2001, pp. 1-2.

Teccor Electronics, "Reference Designs (PDF)," http://www.teccor.com/web/PDF%20Files/Telecom-3_rd_2.pdf. 2004. Teccor Electronics, pp. 1-47.

ONEAC Corporation, "ONEAC Total Protection Installation Handbook for Telecom Systems", 2002, ONEAC Corporation, USA. pp. 1-31.

Knigge, V., "ADSL Communication Line Protection", 2002, ONEAC Corporation, USA. pp. 1-6.

ONEAC Corporation, "ONEAC ADSL Line Protection for Customer and Carrier Premise Equipment", 2002, ONEAC Corporation, USA. pp. 1-4.

Bourns Circuit Protection Solutions, "Outside Plant Products", 2003, Bourne, Inc., USA. pp. 1-10.

Web Proforum Tutorials, "Extending Asymmetric Digital Subscriber Line (ADSL) Services to Remote Digital Loop Carrier (DLC) Locations." The International Engineering Consortium. pp. 1-19, date unavailable.

* cited by examiner

INTEGRATED PROTECTOR AND SPLITTER

FIELD OF THE INVENTION

This disclosure is directed to telephone equipment, and more specifically, to an integrated protector and splitter module for use at a facility for housing telephone-related equipment.

DESCRIPTION OF THE RELATED ART

At facilities for housing telephone-related equipment, for example, a remote terminal, it is necessary to provide primary protection against overvoltage and/or overcurrent conditions that may occur on incoming lines and cables entering the facility. Such incoming lines may include, for example, an outside plant loop (OSP) cable, used in providing telephone services such as plain old telephone service (POTS) and broadband service (i.e. any x Digital Subscriber Line (xDSL) service for Internet or other data, voice over data, video over data, etc. . . . ) to telephone company subscribers. A typical facility for housing telephone-related equipment is illustrated in the block diagram of FIG. 1.

As shown in FIG. 1, a facility for housing telephone-related equipment, here a remote terminal 10, includes one or more protector panels 15 coupled with a digital loop carrier (DLC) 20. The DLC 20 may be further coupled with a multiplexer (MUX) 25. Each protector panel 15 includes a plurality of five pin protector modules 30 that are plugged-into the protector panel 15. The protector modules 30 are used in protecting the remote terminal 10 from overcurrent and/or overvoltage conditions that may be present on incoming lines to the remote terminal 10, for example, incoming lines of OSP cables generally shown at 35 and 40. The OSP cables 35 and 40 each comprise a plurality of twisted wire pairs 45 (hereinafter referred to as subscriber lines), usually provided in 25 pair binder groups, where each subscriber line 45 provides telephone company subscribers with telephone service. The subscriber line 45 is wired to the protector panel 15, and is coupled with a protector module 30 through the protector panel 15.

The protector module 30 protects the telephone facility from overvoltage and overcurrent conditions that may be present at a subscriber line. The protector module 30 is wired to a particular port (not shown, but described in further detail below) on the DLC 20, where the DLC 20 is capable of digitizing a voice signal present on the particular subscriber line 45, and provides the digitized voice signals to the MUX 25. The MUX 25 then multiplexes the digitized voice signals, and transmits them to another telephone facility, for example, a central office (CO).

It may be desirable to provide broadband service (i.e. digital subscriber line (DSL) service) to telephone company subscribers serviced by a particular remote terminal. In this circumstance, the remote terminal servicing the telephone company subscribers must be broadband service capable, meaning that the telephone facility must be capable of processing broadband signals received from, and transmitted over, telephone subscriber lines. A telephone facility may be designed as broadband service capable when it is initially built, or later upgraded to be broadband service capable.

A telephone facility that is being designed, may utilize a DLC that has broadband capabilities, for example, via an integrated broadband MODEM. The broadband capable DLC is then capable of processing broadband data signals received over subscriber lines. However, in some circumstances, it may be desired to design the telephone facility using a DLC that is not broadband capable. In these circumstances, a broadband MODEM is provided that is separate from the DLC (i.e. not integrated within the same circuitry or device as the DLC). Similarly, where broadband service is being added to an already existing remote terminal having a DLC that is not broadband capable, a broadband MODEM separate from the DLC may be utilized.

FIG. 2 illustrates a block diagram of a telephone facility where broadband service is provided using a broadband MODEM separate from the DLC. Elements of FIG. 2 having reference numerals corresponding to elements of FIG. 1 are the same, and will not be discussed in detail. As shown in FIG. 2, a broadband MODEM, here a DSL access multiplexer (DSLAM) 50, is provided for handling broadband service at the telephone facility, here the remote terminal 10. Utilizing the DSLAM 50 requires the addition of cross-connect terminal blocks, here wire-wrap terminal blocks 55, 60, 65 and 70. A jumper (i.e., CAT 5 unshielded cable) must be provided between the terminal blocks 55 and 60 for a particular telephone company subscriber in order to provide the signal received from a subscriber line of the OSP 40 to a bulk splitter panel 75. The bulk splitter panel 75 comprises a circuit board having a plurality of splitter circuits 80. Each splitter circuit 80 is capable of splitting a voice signal from the received signal for a particular subscriber line, where the voice signal is provided to the DLC 20 via a jumper between the terminal blocks 65 and 70. The splitter circuit 80 then provides at least the data (i.e. broadband data) from the particular subscriber line to the DSLAM 50.

In order to provide a subscriber serviced by a subscriber line of OSP cable 40 with broadband service, it is necessary for telephone service personnel to travel to the remote terminal 10, and provide a jumper between the terminal blocks 55 and 60 for the subscriber line. The service technician must then provide a jumper for the subscriber line between the terminal blocks 65 and 70. As space is usually restricted in a remote terminal, the space required for the additional terminal blocks 55, 60, 65 or 70, and associated cabling, as well as the splitter panel 75, may preclude the telephone facility from being enabled with broadband capabilities. Further, it takes a significant amount of time for the telephone service technician to determine the proper location of, and to provide the jumpers between the terminal blocks 55 and 60, and 65 and 70, thereby leaving the particular telephone subscriber without telephone service for a significant time period.

Where a telephone company subscriber desires broadband service, but is serviced by an OSP cable that is not coupled with the broadband MODEM, here the OSP cable 35, the subscriber's service is transferred to an OSP cable that is coupled with the broadband MODEM, here the OSP cable 40. This transfer is called a line station transfer, and involves additional telephone company personnel, and increases the time the subscriber may be left without telephone service.

Accordingly, there is a need for improved telephone related equipment to address the problems discussed above.

DESCRIPTION OF THE DRAWINGS

Figure 1:
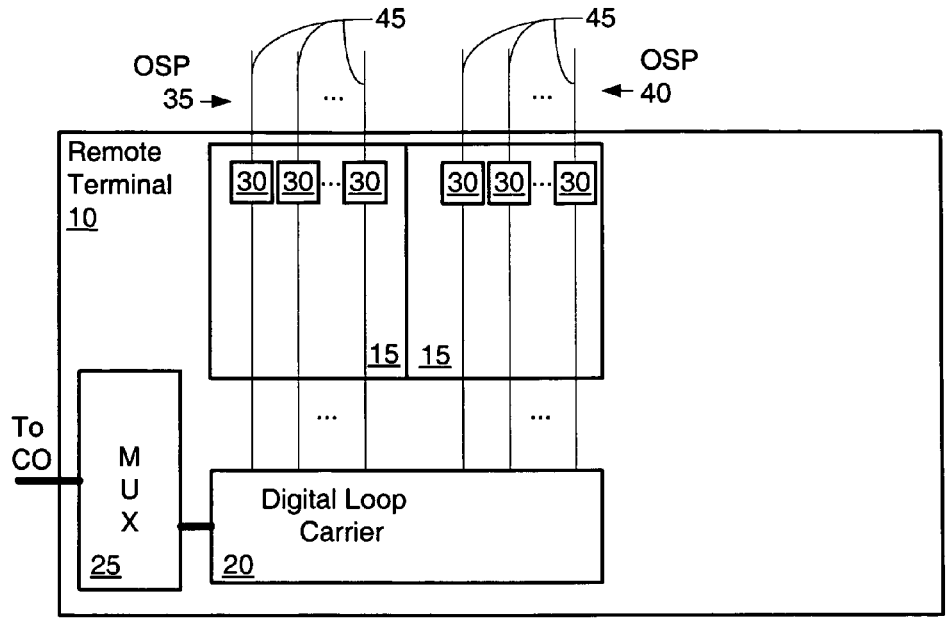
FIG. 1 illustrates a block diagram of a prior art telephone facility.
Figure 2:
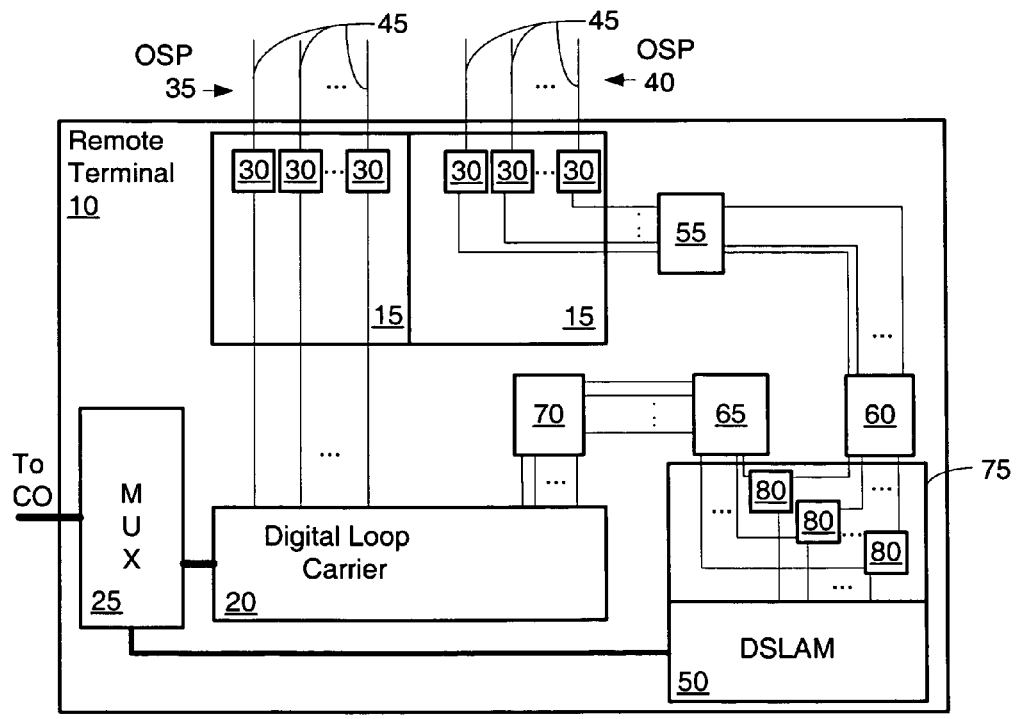
FIG. 2 illustrates a block diagram of a prior art telephone facility that utilizes a broadband MODEM that is separate from a DLC to provide broadband service.

A five pin integrated protector and splitter is provided for use at a protector panel of a facility for housing telephone-related equipment, where the facility includes at least a broadband MODEM separate from a digital loop carrier (DLC). The five pin integrated protector and splitter includes a first pair of module pins for receiving a signal including voice and data, and a protection circuit coupled with the first pair of pins. The protection circuit includes a ground contact for coupling with a ground potential at the protector panel, and for protecting telephone-related equipment from at least one of an overvoltage and overcurrent condition present at the first pair of pins. The five pin integrated protector and splitter further includes a splitter circuit coupled with the protection circuit for splitting the voice from the received signal as a voice signal, and a second pair of module pins coupled with the splitter circuit for providing the voice signal from the five pin module to a DLC.

The integrated protector and splitter may further include a data terminal set coupled with the splitter circuit for providing at least the data of the received signal to the broadband MODEM, where the broadband MODEM is capable of receiving a plurality of data signals from a plurality of telephone subscriber lines.

The five pin integrated protector and splitter assists telephone company personnel in providing broadband service (i.e. any x Digital Subscriber Line (xDSL) service for Internet or other data, voice over data, video over data, etc. ...) for telephone company subscribers. For example, the five pin integrated protector and splitter module reduces the number of jumpers required to provide broadband service for a telephone company subscriber. Requiring less jumper connections to be made reduces the labor and costs associated with providing broadband services, and reduces the chance of an improper jumper connection. Further, the need for less jumper connections reduces the time that a subscriber is without telephone service while broadband service is being provided on the subscriber's telephone line. In addition, broadband service may be provided for a telephone company subscriber being serviced by any outside plant loop (OSP) cable entering a particular telephone company facility. Thus, broadband service may be provided without the necessity of performing a line service transfer for a particular telephone company subscriber. Additionally, as the splitter is integrated with the protector and present within the protector panel, a separate bulk splitter panel need not be provided, thereby conserving space within telephone facilities that are typically space-limited.

The five pin integrated protector and splitter may be utilized and accounted for during design of a telephone facility that will provide both plain old telephone service (POTS) and broadband service, or may be utilized when upgrading telephone facilities previously incompatible with broadband service to facilities capable of processing broadband data. In addition, such five pin integrated protector and splitters may be utilized where telephone facilities are capable of providing broadband service with existing DLCs. For example, a take-rate on a broadband capable DLC (i.e., a projected percentage of telephone subscribers serviced by the telephone facility that will desire broadband service) may be exceeded at a telephone facility. In this circumstance, the five pin integrated protector and splitter may be utilized in conjunction with a broadband MODEM to provide additional broadband capabilities for the telephone facility.

Figure 3:
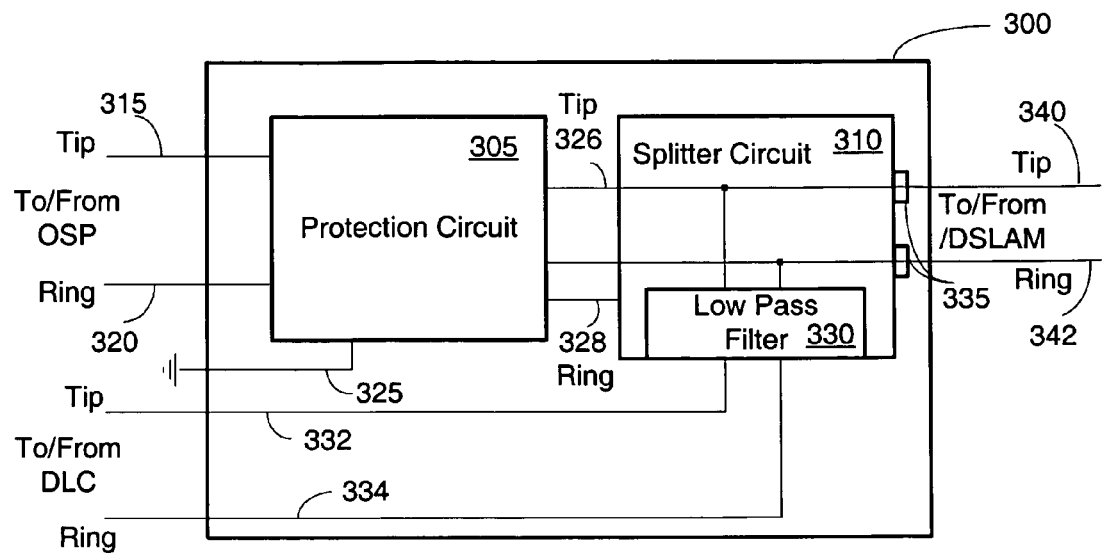
FIG. 3 illustrates a block diagram of a five pin integrated protector and splitter in accordance with an embodiment of the invention.

A block diagram for a five pin integrated protector and splitter is shown in FIG. 3, in accordance with an embodiment of the invention. As shown in FIG. 3, a five pin integrated protector and splitter 300 includes a protection circuit 305 and a splitter circuit 310. The protection circuit 305 may receive a signal that includes voice and/or data (i.e. broadband data) via a subscriber line comprising Tip and Ring 315 and 320, respectively. The Tip and Ring 315 and 320 are one of the plurality of subscriber lines of an OSP cable entering the telephone facility, used to provide telephone service for a particular telephone company subscriber. Protection circuit 305 is further coupled with earth ground via ground connection 325. The ground connection 325 may be provided in any fashion sufficient for grounding protection circuit 305, for example, as a single wire to ground, via circuit traces on a protector panel that the five pin integrated protector and splitter may be connected, or as a back-plane ground provided as part of the protector panel. The protection circuit is coupled with the splitter circuit 310 via protected Tip and Ring 326 and 328, respectively. The splitter circuit 310 includes a low pass filter 330 for filtering the voice from the received signal as a voice signal, and providing the voice signal to the DLC 20. The voice signal may be provided to the DLC 20 by, for example, Tip and Ring 332 and 334, respectively. At least the data of the received signal is provided to the broadband MODEM (i.e., DSL access multiplexer (DSLAM)) through data terminal set 335, and via Tip and Ring 340 and 342, respectively. Where the broadband MODEM is capable of separating the data from the received signal, the signal provided via Tip 340 and Ring 342 may be, for example, a complete signal received at Tip 315 and Ring 320. However, where the broadband MODEM is incapable of separating the data from the received signal, the five pin integrated protector and splitter may include a high pass filter, as shown in the block diagram of FIG. 4.

Figure 4:
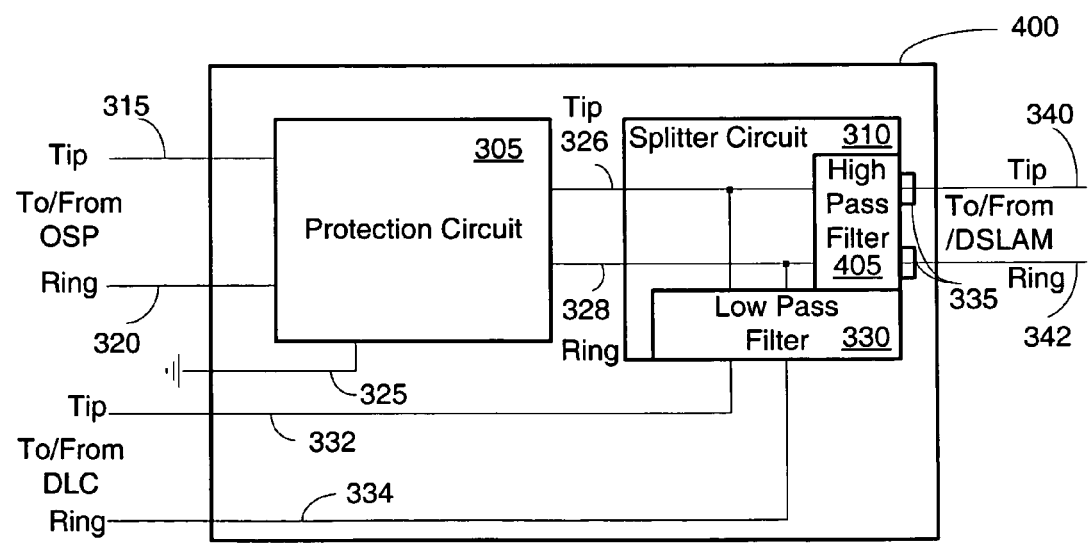
FIG. 4 illustrates a block diagram of a five pin integrated protector and splitter in accordance with another embodiment of the invention.

A five pin integrated protector and splitter 400 is illustrated in the block diagram of FIG. 4, in accordance with another embodiment of the invention. Elements of FIG. 4 having reference numerals corresponding to elements of FIG. 3 are the same and will not be discussed in detail. As shown in FIG. 4, the splitter circuit 310 further includes a high pass filter 405. The protected Tip and Ring 326 and 328 are coupled with the high pass filter 405, where the high pass filter 405 filters the protected Tip and Ring signal to separate the data from the received signal as a data signal. The data signal may then be provided over Tip and Ring 340 and 342 to the DSLAM.

As broadband service is typically provided at carrier frequencies greater than the voice signals, for example, in the frequency range of 26 KHz to 1104 KHz for asynchronous DSL (ADSL), the high pass filter 405 separates the data from the received signals, allowing the data signal to be sent to the broadband MODEM. Thus, where the broadband MODEM does not have capabilities for splitting the data from the signal received at the five pin integrated protector and splitter 400, the five pin integrated protector and splitter 400 of FIG. 4 may be utilized in separating the data signal from the received signal. A perspective view of a five pin integrated protector and splitter is illustrated in conjunction with a protector panel in FIG. 5.

Figure 5:
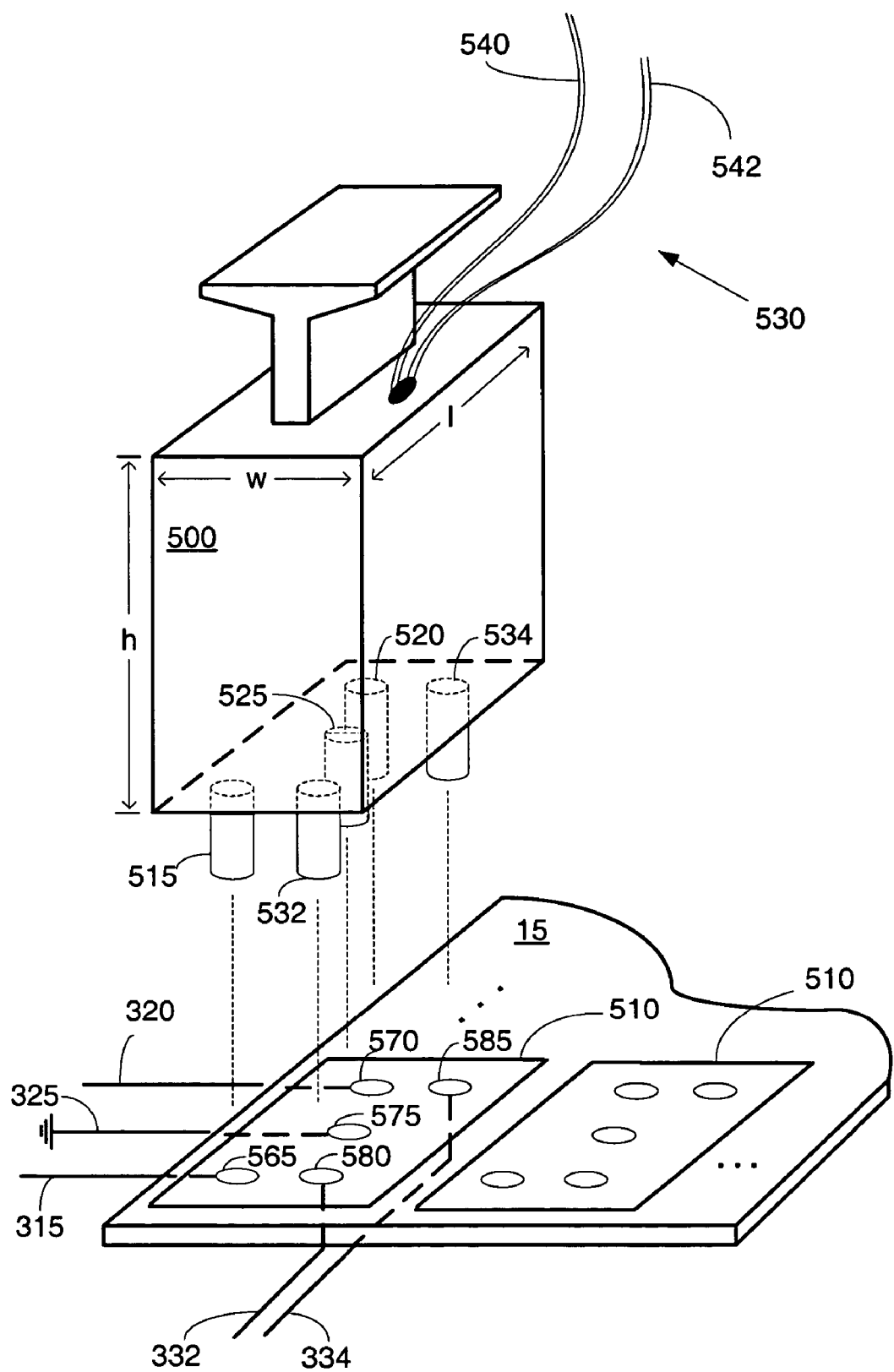
FIG. 5 is a perspective view of a five pin integrated protector and splitter module with a portion of a protector panel, in accordance with an embodiment of the invention.

FIG. 5 illustrates a perspective view of a five pin integrated protector and splitter module 500 and a portion of a corresponding protector panel 15, in accordance with another embodiment of the invention. Elements of FIG. 5 having reference numbers corresponding to elements of FIG. 3 are the same and will not be discussed in detail. The five pin integrated protector and splitter module 500 may include circuitry shown in the blocks of the five pin integrated protector and splitters 300 or 400 discussed above. As shown in FIG. 5, the five pin integrated protector and splitter module 500 includes pins 515, 520, 525, and 532 and 534. The pins 515 and 520 are capable of receiving Tip 315 and Ring 320 of a telephone company subscriber line at a protection circuit (not shown) of the five pin integrated protector and splitter module 500. The pin 525 is capable of providing the ground connection 325 for the five pin integrated protector and splitter 500, and the pins 532 and 534 are capable of providing a voice signal over Tip 332 and Ring 334 to a DLC. Further, a data wire pair (pigtail) generally shown at 530, is provided including a Tip 540 and Ring 542. The pigtail 530 may be, for example, a CAT 5 unshielded twisted pair. The Tip 540 and Ring 542 may be coupled to a data terminal set of the splitter circuit, for example data terminal set 335 (not shown) of the module 500, and further to a broadband MODEM, for example a DSLAM, to provide at least the data signal of the received signal to the broadband MODEM.

Further shown in FIG. 5 is a portion of a protector panel, for example the protector panel 15 discussed above. The protector panel 15 includes a plurality of sockets 510 capable of receiving the five pin integrated protector and splitter module 500. Each socket 510 may include a plurality of protector panel terminal sets (pin jacks), for example, a first protector panel terminal set (pin jacks) 565 and 570, a protector panel ground terminal (pin jack) 575, and a second protector panel terminal set (pin jacks) 580 and 585. A Tip 315 and Ring 320 from an OSP cable may be coupled to pin jacks 565 and 570, respectively, where a ground connection may be provided via pin jack 575. Further, pin jacks 580 and 585 may be utilized to provide a connection between Tip and Ring 332 and 334 and a DLC at the telephone facility, and more specifically, to a particular DLC terminal set (port) designated for the subscriber line utilizing the particular five pin integrated protector and splitter module 500. The spacing of the pin jacks 565, 570, 575, 580 and 585 are sufficient for receiving the pins 515, 520, 525, 532 and 534 of the five pin integrated protector and splitter module 500.

The dimensions w, l and h, and/or proportions of the module 500 shown in FIG. 5 are exemplary, and one skilled would realize that other dimensions may be utilized that would allow the five pin integrated protector and splitter module 500 to be plugged into the protector panel 15. For example, the dimensions w and l may be selected that are substantially similar to that used in five pin protector modules, thereby allowing the use of an existing protector panel. The height, h, of the five pin integrated protector and splitter module 500 may be the same or different from that of a five pin protector module. The dimensions and spacing of the sockets 510 may be altered to allow reception of corresponding five pin integrated protector and splitter modules 500 having w and l dimensions different from the w and l of a five pin protector module. A telephone facility utilizing the five pin integrated protector and splitter module 500 is illustrated in the block diagram of FIG. 6.

Figure 6:
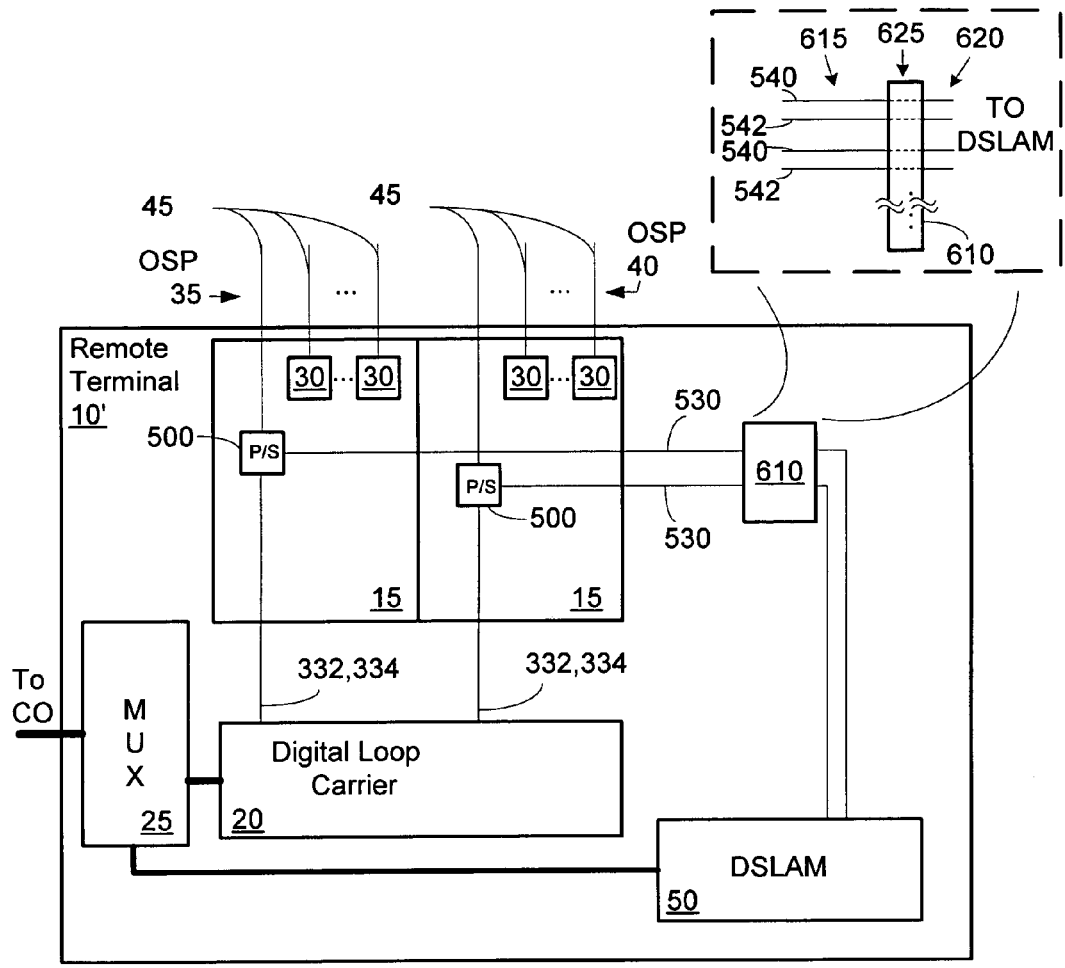
FIG. 6 is a block diagram of a five pin integrated protector and splitter module utilized in a telephone facility, in accordance with an embodiment of the invention.

As shown in FIG. 6, a telephone facility, here a remote terminal 10', is illustrated utilizing the five pin integrated protector and splitter module 500, in accordance with an embodiment of the invention. Elements of FIG. 6 having reference numerals corresponding elements of FIGS. 2-5 are the same and will not be discussed in detail. As shown in FIG. 6, the remote terminal 10' includes two protector panels 15, where subscriber lines 45 comprising Tip 315 and Ring 320 for a telephone subscriber are coupled to the protector panel 15. Each protector panel 15 includes a plurality of sockets (not shown), similar to the sockets 510 described above with respect to FIG. 5. The protector panel 15 is coupled with a DLC 20, which is further coupled with a MUX 25. For simplicity purposes, connections between protector modules 30 and the DLC are not shown in FIG. 6. As the remote terminal 10' is capable of providing both POTS as well as broadband service to telephone company subscribers, a DSLAM 50 is provided. A DSLAM 50 is coupled with one or more five pin integrated protector and splitter modules 500 via a terminal block 610, and to the MUX 25.

Shown in the expanded portion of FIG. 6 is an exemplary side view of the terminal block 610. The terminal block 610 includes a plurality of corresponding terminal pairs shown generally at 615 and 620, that are placed through an insulating material shown generally at 625 (i.e. non-conductive plastic). The corresponding terminal pair 615 and 620 may be comprised of, for example, a pair of pins placed through the insulating material 625. The corresponding terminal pair 615 may represent the pair of pins at the protector panel block-side of the Terminal block 610 that are connected with the pigtail 530, and the corresponding terminal pair 620 may represent the other end of the pair of pins at the DSLAM-side of the terminal block that are connected with the DSLAM. The first terminal pair 615 may be coupled with the pigtail 530, specifically the Tip 540 and Ring 542, for a particular five pin integrated protector and splitter module 500, providing at least the data of the received signal to the terminal block 610. The terminal block 610 is typically pre-wired with the DSLAM 50. In this circumstance, the corresponding terminal pair 620 of the terminal block 610 is already coupled to a particular port of the DSLAM 50, where the particular port is designated for the telephone subscriber being serviced through the particular five pin integrated protector and splitter module 500.

Figure 7:
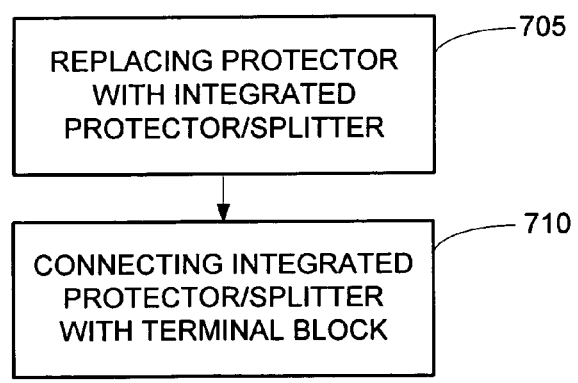
FIG. 7 is a flowchart illustrating use of a five pin integrated protector and splitter in providing broadband service to a telephone company subscriber, in accordance with an embodiment of the invention.

Utilization of the five pin integrated protector and splitter module 500 in providing broadband service to a telephone company subscriber is illustrated in the flow chart of FIG. 7, in accordance with an embodiment of the invention. As shown at block 705, a five pin protector corresponding to the telephone company subscriber serviced by a Tip 315 and Ring 320 is replaced with a five pin integrated protector and splitter module 500. The replacement typically involves unplugging the protector module for a telephone subscriber from a socket of the protector panel 15, and plugging-in the five pin integrated protector and splitter module 500 at the socket. Replacing the protector module with the integrated protector and splitter module automatically provides the voice signal of a telephone subscriber line to the DLC via the pins 532 and 534 and corresponding pin jacks 580 and 585 of the protector panel socket 510. The pigtail 530 of the five pin integrated protector and splitter module 500 is connected (i.e., wire-wrapped, soldered or any other connection means as would be appreciated by one skilled in the art) to the appropriate terminal pair 615 on the terminal block 610 for the subscriber line, as shown at block 710. As the terminal block 610 is typically pre-wired with the DSLAM 50, a telephone company subscriber is, in this way, provided with broadband service. Thus, a telephone subscriber may be provided with broadband service without multiple jumpers needing to be connected, and without any necessity of performing a LST on the telephone company subscriber's telephone line. Further, since there is only one jumper connection to be performed, the chance of error in an improper connection of the pigtail 530 to the terminal block 610 is reduced, and the telephone company subscriber service is disconnected for substantially less time than where a bulk splitter panel is used.

The protector panels 15 of FIG. 6 are illustrated as utilizing both five pin protector modules 30, and five pin integrated protector and splitter modules 500. One skilled would realize that the protector panels may utilize only the five pin integrated protector and splitters modules 500, and five pin protection modules are not necessary.

Although the five pin integrated protector and splitter 300, 400, or 500 are described above with respect to being used at a remote terminal, one skilled would realize that the five pin integrated protector and splitters may be used at any facility for housing telephone-related equipment that employs a protector panel, and a DSLAM that is separate from the digital loop carrier. Such facilities may include, but are not limited to, a remote terminal or a telephone company central office. Remote terminals may include, but are not limited to, remote terminal cabinets, huts, or environment controlled vaults.

The five pin integrated protector and splitter may be utilized alone, or as part of a broadband upgrade kit for a telephone facility. The broadband upgrade kit may include, for example, a plurality of five pin integrated protector and splitter modules, along with a broadband MODEM such as a DSLAM, and a terminal block such as a wire-wrap terminal block. In this way, the upgrade kit would be capable of upgrading telephone facilities incapable of providing broadband service to one with broadband capability. In the alternative, the kit may be used in providing additional broadband capabilities at a telephone facility utilizing a broadband capable DLC, where the broadband service take-rate of the DLC has been exceeded.

The broadband service discussed herein may include any broadband service where it is desirable to split the voice from the combined voice and broadband signal received at the protector panel. For example, the broadband service may be any data service including any xDSL service such as ADSL, VDSL, and HDSL, for providing a private line data circuit, voice over data, and video over data capabilities. The broadband service may thus be used to provide, for example, Internet service, or video-phone or peer to peer communication capabilities between two or more subscriber lines. The broadband service may include any other type of broadband service that may operate using any frequency band over the telephone subscriber twisted wire pair.

Although the five pin integrated protector and splitter modules have been described above as including pins for coupling the module to the protector panel, one skilled would realize that the use of the term 'pins' may include other connection schemes. For example, the integrated protector and splitter module may utilize any friction-based contacts so long as substantially corresponding mating terminals are provided on the protector panel to allow the five pin integrated protection and splitter module to be held in place at the protector panel. Alternatively, the integrated protector and splitter module may utilize any non-friction based connectors (i.e. zero-friction sockets), so long as the connection scheme is capable of coupling the module with the protector panel. Although the pigtail 530 is illustrated as exiting the five pin integrated protection and splitter module 500 from a side of the module opposite the side where the pins are provided, one skilled would realize that the pigtail may exit from any side of the integrated protector and splitter module, including the pin side. For example, where the pigtail exits the module 500 from a side adjacent the pin side, the pig tail wires may be selected to allow them to fit in the space between adjacent protector and splitter modules plugged-into the protector panel. In addition, or in the alternative, the spacing between integrated protector and splitter modules may be altered to allow the pigtail to fit between adjacent modules of the protector panel. In the alternative and not shown, a furrow may be provided in the side wall of the module in which the pigtail may be placed, while allowing the module to be placed with adjacent modules on the protector panel. Where the pigtail exits on the same side of the integrated protector and splitter module as the pins, a furrow may be provided along the pin side in which the pigtail may be placed. Although the pigtail 530 has been described above as being a CAT 5 unshielded wire pair, it will be apparent to one skilled in the art that the pigtail 530 may be comprised of any wires, circuitry, or material capable of conveying at least the broadband data to the broadband MODEM.

The protector circuit, for example protector circuit 305, may be any protector circuit capable of providing primary protection from at least one of overvoltage and overcurrent conditions present on lines entering the telephone facility. The protector circuit may be, for example, but not limited to, circuitry similar to that of a Marconi Model Nos. R3B1EJZ or R4B1EJZ. The protector circuit may further be capable of meeting Telecordia 1361, Telecordia 974, RUS PE-80 requirements, or any other desirable requirement or standard. Similarly, the splitter circuit 310 may be similar to any splitter circuit, for example, that is typically employed at a bulk splitter panel. Such splitter circuitry may include, but is not limited to, individual splitter circuitry of splitter panels similar to that manufactured by Alacatel or Corning. Further, the splitter circuit may be capable of meeting ANSI T1.413 specifications, or any other desirable requirement or specification. In any event, the splitter circuit need only be capable of separating the voice signal from a signal received at the five pin integrated protector and splitter 300, or if desirable, be capable of additionally separating the data signal from the received signal in the case of the five pin integrated protector and splitter 400.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A five pin integrated protector and splitter module for use at a protector panel of a facility for housing telephone-related equipment, the module comprising:
   a first side and a second side;
   a first pair of module pins for receiving a signal including voice and data on the first side of the module;
   a protection circuit coupled to the first pair of module pins, including a ground contact for coupling with a ground potential at the protector panel, to protect telephone-related equipment from at least one of an overvoltage and overcurrent condition present at the first pair of module pins;
a splitter circuit coupled to the protection circuit, to separate the voice from the received signal as a voice signal;
a second pair of module pins on the first side of the module, the second pair of module pins coupled to the splitter circuit, to provide the voice signal to the digital loop carrier;
a data wire pair extending from the second side of the module to provide the data of the received signal to a broadband MODEM; and
a furrow in at least one side of the module to receive the data wire air when the module is installed in the protector panel.

2. The five pin integrated protector and splitter module of claim 1, wherein the telephone facility includes a terminal block having a plurality of corresponding terminal pairs, wherein one of the corresponding terminal pairs is coupled with the data wire pair, and the other of the corresponding terminal pairs is coupled with the broadband MODEM.

3. The five pin integrated protector and splitter module of claim 1, wherein an outside plant loop cable is coupled with the protector panel, the outside plant loop cable comprising a plurality of twisted wire pairs over which the signal including the voice and data is transmitted, and wherein at least one twisted wire pair of the outside plant loop cable is coupled with the first pair of module pins.

4. The five pin integrated protector and splitter module of claim 1, wherein the first pair of module pins, the second pair of module pins and a ground pin are configured for inserting the five pin integrated protector and splitter module at the protector panel.

5. The five pin integrated protector and splitter module of claim 1, wherein the voice signal is a plain old telephone service voice signal.

6. The five pin integrated protector and splitter module of claim 1, wherein the data signal is a broadband signal.

7. The five pin integrated protector and splitter module of claim 6, wherein the broadband signal is a digital subscriber line signal.

8. The five pin integrated protector and splitter module of claim 1, wherein the broadband MODEM is a digital subscriber line access multiplexer.

9. The five pin integrated protector and splitter module of claim 1, wherein the facility for housing telephone-related equipment is a remote terminal telephone facility.

10. Telephone related equipment capable of providing broadband capability, comprising:
a broadband modem;
a protector panel including:
a plurality of protector panel terminal sets, the protector panel terminal sets including a first protector panel terminal set, and a corresponding second protector panel terminal set and ground terminal, the first protector panel terminal set capable of receiving a signal including voice and data,
an integrated protection and splitter module coupled with at least one of the protector panel terminal sets, the module including:
a protection circuit coupled with the first protector panel terminal set and including a module ground terminal for coupling with the ground terminal and capable of protecting telephone related equipment from at least one of an overvoltage and overcurrent condition accompanying the received signal,
a splitter circuit coupled with the protection circuit, capable of splitting the voice from the received signal as a voice signal, and providing the voice signal to the corresponding second protector panel terminal set;
a data wire pair coupled to the broadband modem to provide the data from the received signal to the broadband modem as a data signal;
wherein the integrated protection and splitter module comprises a furrow in at least one side of the module to receive the data wire pair when the module is installed in the protector panel; and
a Digital Loop Carrier (DLC) having a plurality of DLC terminal sets, each of the DLC terminal sets capable of receiving the voice signal provided at the corresponding second protector panel terminal set.

11. An upgrade kit for providing broadband service access at a facility for housing telephone related equipment, comprising:
an integrated protector and splitter module having a first side and a second side and capable of being inserted into a protector panel of the facility and for receiving a signal including voice and broadband data, wherein the first side of the module contacts the protector panel when inserted therein, the integrated protector and splitter module including:
a protection circuit including a ground terminal, and capable of protecting telephone related equipment from at least one of an overvoltage and overcurrent condition accompanying the received signal using the ground terminal,
a splitter circuit coupled with the protection circuit, capable of splitting the voice from the received signal as a voice signal and including a data terminal set for providing at least the broadband data of the received signal,
a data wire pair coupled to the data terminal set; and
a furrow in at least one side of the module to receive the data wire pair when the module is installed in the protector panel; and
a broadband MODEM capable of being coupled with the data terminal set via the data wire pair, and having capabilities for handling at least the broadband data for a plurality of integrated protector and splitter modules.

12. The upgrade kit of claim 11, further comprising a terminal block having a plurality of corresponding terminal pairs, wherein one of the corresponding terminal pairs is coupled with the data wire pair, and the other of the corresponding terminal pairs is coupled with the broadband MODEM.

13. A method of enabling broadband service at a facility for housing telephone-related equipment, the method comprising:
providing an integrated protector and splitter module having a first side and a second side and capable of protecting telephone-related equipment from at least one of an overvoltage and overcurrent condition accompanying a received signal and splitting a voice signal from the received signal, the broadband service provided over a subscriber line capable of conveying a signal including voice and data, the integrated protector and splitter module including a data wire pair coupled to a data terminal set;
inserting the integrated protector and splitter module into a location of a protector panel of the facility corresponding to the subscriber line, wherein the first side of the module contacts the protector panel when inserted therein; and coupling the data wire pair of the integrated protection and splitter module with a broadband MODEM, the broadband MODEM capable of handling at least data from a plurality of integrated protection and splitter modules;

wherein the integrated protection and splitter module comprises a furrow in at least one side of the module to receive the data wire pair when the module is installed in the protector panel.

14. The method of claim 13, wherein the facility for housing telephone-related equipment further includes a terminal block, and the coupling of the data wire pair with the broadband MODEM includes coupling the data wire pair to the terminal block.

15. The method of claim 14, wherein the broadband MODEM is an Internet broadband MODEM and wherein the coupling of the data wire pair with the Internet broadband MODEM further includes coupling the terminal block with the Internet broadband MODEM.

16. The method of claim 13, wherein inserting the integrated protector and splitter module into a location of the protector panel automatically provides the voice signal from the integrated protection and splitter module to a digital loop carrier of the facility.

17. The method of claim 13, wherein inserting the integrated protector and splitter module into a location of the protector panel is accomplished after removing a protector module from the location of the protector panel.

18. The five pin integrated protector and splitter module of claim 1, wherein the second side of the module is opposite the first side of the module.

19. The five pin integrated protector and splitter module of claim 1, wherein the second side of the module is adjacent to the first side of the module.

* * * * *